United States Patent
Ogren

(10) Patent No.: US 10,414,124 B2
(45) Date of Patent: Sep. 17, 2019

(54) ASSEMBLY AND METHOD FOR CREATING FOLDER POCKETS FROM PRINTABLE BLANK SHEETS

(71) Applicant: Blank Acquisition, LLC, Brooklyn Park, MN (US)

(72) Inventor: Andrew R. Ogren, Woodbury, MN (US)

(73) Assignee: Blank Acquisition, LLC, Brooklyn Park, MN (US)

( * ) Notice: Subject to any disclaimer, the term of this patent is extended or adjusted under 35 U.S.C. 154(b) by 0 days.

(21) Appl. No.: 15/266,450

(22) Filed: Sep. 15, 2016

(65) Prior Publication Data
US 2018/0072038 A1   Mar. 15, 2018

(51) Int. Cl.
*B32B 7/12* (2006.01)
*B32B 38/10* (2006.01)
*B32B 38/00* (2006.01)

(52) U.S. Cl.
CPC ............... *B32B 7/12* (2013.01); *B32B 38/10* (2013.01); *B32B 38/0004* (2013.01); *B32B 2307/75* (2013.01); *B32B 2309/105* (2013.01); *B32B 2323/04* (2013.01); *B32B 2327/06* (2013.01); *B32B 2367/00* (2013.01)

(58) Field of Classification Search
USPC ...... 156/247, 249, 277, 289; 428/40.1, 41.7, 428/41.8, 42.2, 43, 343, 352
See application file for complete search history.

(56) References Cited

U.S. PATENT DOCUMENTS

| | | |
|---|---|---|
| 3,598,303 A | 8/1971 | Folz |
| 3,858,792 A | 1/1975 | Volkert |
| 4,100,718 A | 7/1978 | Focke et al. |
| 4,301,962 A | 11/1981 | Monckton et al. |
| 4,544,590 A | 10/1985 | Egan |
| 4,691,858 A | 9/1987 | Peer, Jr. |
| 4,735,356 A | 4/1988 | Engel |
| 4,863,093 A | 9/1989 | DuCorday |
| 5,071,062 A | 12/1991 | Bradley et al. |
| 5,141,485 A | 8/1992 | Welt |
| 5,219,183 A | 6/1993 | McKillip |

(Continued)

FOREIGN PATENT DOCUMENTS

| | | |
|---|---|---|
| GB | 955472 | 4/1964 |
| GB | 2447615 A | 9/2008 |
| GB | 2479714 A | 10/2011 |

OTHER PUBLICATIONS

Promotional Products You Can Print on | Blanks/USA, http://www.blanksusa.com/products/promotional-products Jun. 20, 2014, 2 pages.

(Continued)

*Primary Examiner* — Sing P Chan
(74) *Attorney, Agent, or Firm* — Kinney & Lange, P.A.

(57) ABSTRACT

A printable blank sheet includes a sheet with a top substrate and a bottom layer, a dry lift adhesive connecting the top substrate to the bottom layer, cut lines in the sheet that extend through the top substrate and the dry lift adhesive but not through the bottom layer, and a folder pocket cut into the top substrate with a periphery of the folder pocket defined by the cut lines. The folder pocket can be removed from the sheet by separating the folder pocket and the bottom layer along the dry lift adhesive.

18 Claims, 16 Drawing Sheets

(56) References Cited

U.S. PATENT DOCUMENTS

| | | |
|---|---|---|
| 5,337,889 A | 8/1994 | Chan |
| 5,447,333 A | 9/1995 | Kuhns et al. |
| 5,462,488 A | 10/1995 | McKillip |
| 5,466,013 A | 11/1995 | Garrison |
| 5,538,288 A | 7/1996 | Heath |
| 5,571,587 A | 11/1996 | Bishop et al. |
| 5,589,025 A | 12/1996 | Garrison |
| 5,595,403 A | 1/1997 | Garrison |
| 5,736,212 A | 4/1998 | Fischer |
| 5,782,497 A | 7/1998 | Casagrande |
| 5,797,304 A | 8/1998 | Sterr et al. |
| 5,836,507 A | 11/1998 | Mueller et al. |
| 5,842,722 A | 12/1998 | Carlson |
| 5,853,837 A | 12/1998 | Popat |
| 5,890,743 A | 4/1999 | Garrison et al. |
| 5,996,130 A | 12/1999 | Verhines |
| 6,016,618 A | 1/2000 | Attia et al. |
| 6,022,051 A | 2/2000 | Casagrande |
| 6,063,226 A | 5/2000 | Foster et al. |
| 6,116,651 A | 9/2000 | Makofsky et al. |
| 6,117,061 A | 9/2000 | Popat et al. |
| 6,193,457 B1 | 2/2001 | Pacione |
| 6,257,404 B1 | 7/2001 | Tracy et al. |
| 6,279,821 B1 | 8/2001 | Kubitsky et al. |
| 6,290,261 B1 | 9/2001 | Waggoner et al. |
| 6,294,237 B1 | 9/2001 | Popat |
| 6,299,401 B1 | 10/2001 | Pacione |
| 6,328,340 B1 | 12/2001 | Fischer |
| 6,358,587 B1 | 3/2002 | Saint et al. |
| 6,440,050 B1 | 8/2002 | Capparelli et al. |
| 6,581,971 B1 | 6/2003 | MacWilliams |
| 6,585,845 B1 | 7/2003 | Peterson |
| 6,666,610 B1 | 12/2003 | Moor et al. |
| 6,740,189 B1 | 5/2004 | Burrow et al. |
| 6,837,955 B1 | 1/2005 | McCarthy et al. |
| 6,845,864 B2 | 1/2005 | Taw et al. |
| 6,966,483 B2 | 11/2005 | Manninen |
| 6,991,259 B2 | 1/2006 | Schwarzbauer et al. |
| 6,991,839 B2 | 1/2006 | Maier |
| 7,153,254 B2 | 12/2006 | Cordes |
| 7,165,713 B2 | 1/2007 | Allee |
| 7,260,907 B2 | 8/2007 | Sturba et al. |
| 7,322,613 B2 | 1/2008 | Penuela et al. |
| 7,357,423 B2 | 4/2008 | Fabel et al. |
| 7,579,076 B2 | 8/2009 | Ishikawa |
| 7,658,993 B2 | 2/2010 | Dronzek, Jr. et al. |
| 7,784,209 B2 | 8/2010 | Greer |
| 7,841,114 B2 | 11/2010 | McCarthy et al. |
| RE42,798 E | 10/2011 | Utz et al. |
| 8,162,204 B2 | 4/2012 | Makofsky |
| 8,507,064 B2 | 8/2013 | McCarthy et al. |
| 8,524,141 B2 | 9/2013 | Utz et al. |
| 8,528,940 B1 | 9/2013 | Vanenti, Jr. et al. |
| 8,530,020 B2 | 9/2013 | McCarthy et al. |
| 8,684,259 B2 | 4/2014 | Makofsky et al. |
| 9,010,619 B2 | 4/2015 | Makofsky et al. |
| 9,296,247 B2 | 3/2016 | Christensen et al. |
| 9,330,579 B2 | 5/2016 | Weinstein |
| 9,469,082 B2 | 10/2016 | Carroll |
| 9,613,547 B2 | 4/2017 | Weiner et al. |
| 9,833,971 B2 | 12/2017 | Ogren |
| 10,017,002 B2 | 7/2018 | James, Jr. et al. |
| 2001/0007703 A1 | 7/2001 | Weirather et al. |
| 2002/0187285 A1 | 12/2002 | Mitchell et al. |
| 2003/0138598 A1 | 7/2003 | Rawlings |
| 2003/0177681 A1 | 9/2003 | Riley |
| 2005/0082356 A1 | 4/2005 | Shadrach |
| 2005/0123705 A1 | 6/2005 | Dronzek, Jr. et al. |
| 2005/0127148 A1 | 6/2005 | Gecha |
| 2005/0133576 A1 | 6/2005 | Maier et al. |
| 2005/0156017 A1* | 7/2005 | Crum ................. B42F 7/06 229/67.1 |
| 2006/0202002 A1 | 9/2006 | Retucci |
| 2007/0009716 A1 | 1/2007 | Crum |
| 2007/0029779 A1 | 2/2007 | Silvers et al. |
| 2007/0114789 A1 | 5/2007 | Morrish |
| 2008/0000118 A1 | 1/2008 | Suzuki |
| 2008/0138556 A1 | 6/2008 | Emmert et al. |
| 2009/0256346 A1 | 10/2009 | Brody |
| 2010/0038897 A1 | 2/2010 | Porter |
| 2011/0098168 A1 | 4/2011 | Best et al. |
| 2011/0212286 A1 | 9/2011 | Lund |
| 2013/0145663 A1 | 6/2013 | Greer |
| 2014/0069994 A1 | 3/2014 | Carroll |
| 2015/0266261 A1 | 9/2015 | Carroll |
| 2016/0015197 A1 | 1/2016 | Jacobs |
| 2016/0293061 A1 | 10/2016 | Becker et al. |
| 2016/0347018 A1 | 12/2016 | Carroll |
| 2017/0001408 A1 | 1/2017 | Carroll |
| 2017/0057202 A1 | 3/2017 | Ogren |
| 2017/0232707 A1 | 8/2017 | Ogren |

OTHER PUBLICATIONS

Dimensional | Mohawk Connects, http://www.mohawkconnects.com/products/digital/mohawk-dimensional, Jun. 20, 2014, 2 pages.

Light Fab Fold-Ups—lightfab.com—Fold, Ups, Ups, Fold Ups, Foldup . . . , http://lightfab.com/products/Light_Fab_Fold_Ups, Jun. 20, 2014, 1 page.

Relyco Business Solutions—Relyco Digipop Custom Digital Packaging . . . , http://www.relyco.com/indes.php/products/digipop-packaging-solutions, Jun. 20, 2014, 8 pages.

Relyco, DigiPOP Packaging Solutions, http://www.relyco.com/en/Products/DigiPOP%20Packaging%Solutions.aspx, May 21, 2012, 16 pages.

* cited by examiner

ASSEMBLY AND METHOD FOR CREATING FOLDER POCKETS FROM PRINTABLE BLANK SHEETS

BACKGROUND

The present invention relates to printable blank sheets, and in particular, to printable blank sheets that are capable of being formed into custom structures.

Custom print materials have become a common way for businesses to market themselves. Custom print materials that are typically used in advertising include two-dimensional products like postcards, flyers and door hangers, as well as three-dimensional products like golf ball boxes, candy boxes and pop-up calendars. Typically, custom print materials are sent to print shops that specialize in preparing custom print materials, as the materials have had to be printed and assembled by specialized machines. As a result, having custom print materials made can be costly and time-consuming. Further, specialty print shops typically require custom print materials to be ordered in large amounts.

Some printable blank templates are currently available for creating custom print materials without having to send them to print shops. These templates are die-cut with perforations and scored lines. The perforations surround the desired shape of the object and the scored lines indicate where the object should be folded if the object is a three-dimensional structure. The drawback to the currently available die-cut templates is that it is hard to detach the desired objects from the excess sheet when the objects have an intricate shape. Trying to separate the perforated lines often causes tearing of the object, which affects the strength and image of the resulting structure. The perforations surrounding the object can also leave rough edges on the structure where the perforations were torn apart. Further, it is time consuming to remove the objects from the sheet, especially if taking care not to tear the object as it is removed from the sheet.

SUMMARY

A printable blank sheet includes a sheet with a top substrate and a bottom layer, a dry lift adhesive connecting the top substrate to the bottom layer, cut lines in the sheet that extend through the top substrate and the dry lift adhesive but not through the bottom layer, and a folder pocket cut into the top substrate with a periphery of the folder pocket defined by the cut lines. The folder pocket can be removed from the sheet by separating the folder pocket and the bottom layer along the dry lift adhesive.

A printable blank sheet includes a sheet with a top substrate and a bottom layer, a dry lift adhesive connecting the top substrate to the bottom layer, cut lines in the sheet that extend through the top substrate and the dry lift adhesive but not through the bottom layer, a folder pocket cut into the top substrate with a periphery of the folder pocket defined by the cut lines, a first adhesive strip on the folder pocket, and a first adhesive cover is positioned on the first adhesive strip. The folder pocket can be removed from the sheet by separating the folder pocket and the bottom layer along the dry lift adhesive.

A method of creating a custom print folder pocket includes running a printable blank sheet through a printer and separating the folder pocket from the back layer along the dry lift adhesive. The sheet includes a top substrate that is attached to a back layer with a dry lift adhesive. The top substrate is printed on when the printable blank sheet is run through the printer. The sheet has cut lines extending through the top substrate and the dry lift adhesive but not through the back layer. The cut lines define a periphery of a folder pocket formed in the top substrate of the sheet.

DETAILED DESCRIPTION

In general, the present disclosure describes a printable blank sheet that is capable of being printed on to form folder pockets. The printable blank sheet includes a plurality of layers, including a printable substrate, a dry lift adhesive, and a film layer. A periphery of a folder pocket can be defined in the printable blank sheet by cutting through the printable substrate and the dry lift adhesive but not through the film layer. The dry lift adhesive holds the printable substrate on the film layer after the folder pocket has been cut out of the printable substrate so that the printable blank sheet can be run through a printer. After the printable blank sheet has been printed on, the folder pocket can be separated from the film layer along the dry lift adhesive. A majority of the dry lift adhesive will remain on the film layer after the folder pocket has been removed. The dry lift adhesive has a dry release so neither the folder pocket nor the film layer will have a sticky residue on them after the folder pocket is separated from the film layer. The folder pocket can then be assembled by folding it along scored lines, adhering the folder pocket together, and adhering it to a folder blank.

Providing a printable blank sheet with a dry lift adhesive between a printable substrate and a film layer is advantageous. First, the dry lift adhesive will hold the printable substrate on the film layer even after a periphery of the folder pocket is cut through the printable substrate. This allows the printable blank sheet to be run through the printer. This also allows the folder pocket to be quickly removed from the sheet, as the folder pocket has to be merely pulled out of the sheet. Second, cutting through the printable substrate and the dry lift adhesive will leave the folder pocket with clean edges after it has been removed from the printable blank sheet. Third, the printable substrate includes a film layer to provide strength to the printable substrate. This will prevent the folder pocket from being torn when it is removed from the printable blank sheet. Further, the film layer on the folder pocket will allow the folder pocket to be moisture resistant and will give the folder pocket a greater strength.

Figure 1:
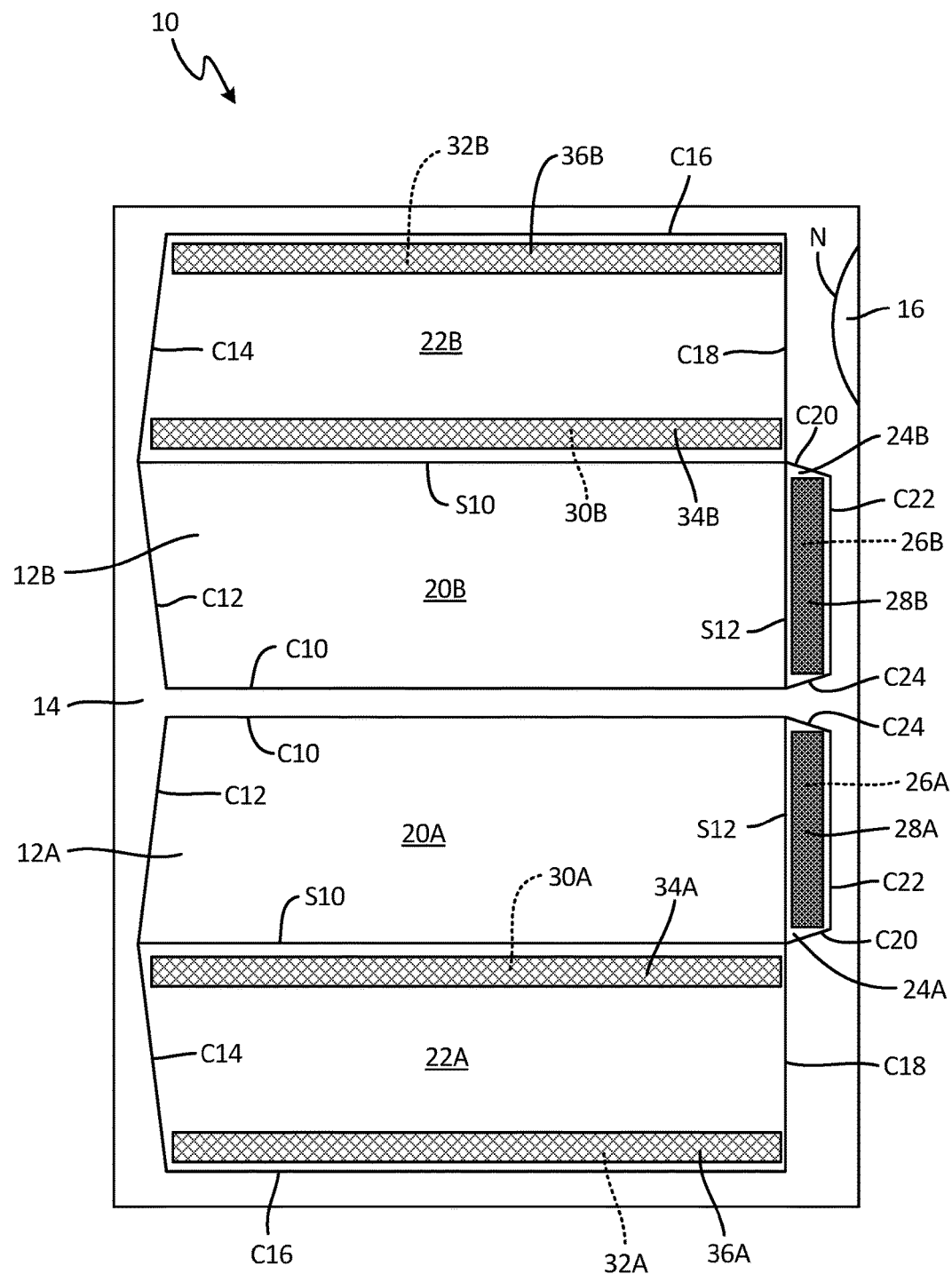
FIG. 1 is a top plan view of folder pockets in a printable blank sheet.

FIG. 1 is top plan view of folder pockets 12A and 12B in printable blank sheet 10. Printable blank sheet 10 includes folder pocket 12A, folder pocket 12B, excess sheet area 14, notch 16, cut lines C10, C12, C14, C16, C18, C20, C22, and C24, scored lines S10 and S12, and notch cut line N. Folder pocket 12A includes front panel 20A, back panel 22A, tab 24A, adhesive strip 26A, adhesive cover 28A, adhesive strip 30A, adhesive cover 32A, adhesive strip 34A, and adhesive cover 36A. Folder pocket 12B includes front panel 20B, back panel 22B, tab 24B, adhesive strip 26B, adhesive cover 28B, adhesive strip 30B, adhesive cover 32B, adhesive strip 34B, and adhesive cover 36B.

Printable blank sheet 10 is a flat sheet that is capable of being run through a printer. Printable blank sheet 10 includes a plurality of layers, including a printable substrate attached to a film layer with a dry lift adhesive. Folder pockets 12A and 12B are positioned on printable blank sheet 10 and are capable of being removed from printable blank sheet 10 to be assembled and adhered to a folder blank. Excess sheet area 14 surrounds folder pockets 12A and 12B. After folder pockets 12A and 12B have been removed from printable blank sheet 10, excess sheet area 14 can be discarded. Cut lines C10-C24 define the peripheries of folder pockets 12A and 12B along which folder pockets 12A and 12B can be removed from printable blank sheet 10. Cut lines C10-C24 extend through the printable substrate and dry lift adhesive layers of printable blank sheet 10 but not through the film layer. Scored lines S10-S12 are placed on folder pockets 12A and 12B and define areas where folder pockets 12A and 12B can be folded. Scored lines S10-S12 are areas where printable blank sheet 10 has been put under pressure to create a line of weakness in printable blank sheet 10 along which printable blank sheet 10 can be easily folded. Printable blank sheet 10 further includes notch 16. Notch cut line N defines the periphery of notch 16 and extends through the printable substrate and dry lift adhesive layers of printable blank sheet 10 but not through the film layer. Notch 16 allows a user to separate the printable substrate from the film layer along the dry lift adhesive.

Folder pocket 12A includes front panel 20A, back panel 22A, and tab 24A. Front panel 20A has sides made of cut line C10, cut line C12, scored line S10, and scored line S12. Back panel 22A has sides made of scored line S10, cut line C14, cut line C16, and cut line C18. Tab 24A has sides made of scored line S12, cut line C20, cut line C22, and cut line C24. Front panel 20A is connected to back panel 22A along scored line S10. Front panel 20A is connected to tab 24A along scored line S12. Cut lines C10-C24 define an outline of folder pocket 12A.

Front panel 20A forms a front of folder pocket 12A when folder pocket 12A is assembled and back panel 22A forms a back of folder pocket 12A when folder pocket 12A is assembled. Tab 24A is connected to front panel 20A and is adhered to back panel 22A to hold folder pocket 12A together. Adhesive strip 26A is positioned on tab 24A. Adhesive cover 28A covers adhesive strip 26A. Adhesive cover 28A can be removed to expose adhesive strip 26A. Adhesive strip 30A and adhesive strip 32A are on back panel 22A. Adhesive cover 34A covers adhesive strip 30A and adhesive cover 36A covers adhesive strip 32A. Adhesive cover 34A and adhesive covers 36A can be removed to expose adhesive strip 30A and adhesive strip 32A, respectively.

Folder pocket 12B includes front panel 20B, back panel 22B, and tab 24B. Front panel 20B has sides made of cut line C10, cut line C12, scored line S10, and scored line S12. Back panel 22B has sides made of scored line S10, cut line C14, cut line C16, and cut line C18. Tab 24B has sides made of scored line S12, cut line C20, cut line C22, and cut line C24. Front panel 20B is connected to back panel 22B along scored line S10. Front panel 20B is connected to tab 24B along scored line S12. Cut lines C10-C24 define an outline of folder pocket 12B.

Front panel 20B forms a front of folder pocket 12B when folder pocket 12B is assembled and back panel 22B forms a back of folder pocket 12B when folder pocket 12B is assembled. Tab 24B is connected to front panel 20B and is adhered to back panel 22B to hold folder pocket 12B together. Adhesive strip 26B is positioned on tab 24B. Adhesive cover 28B covers adhesive strip 26B. Adhesive cover 28B can be removed to expose adhesive strip 26B. Adhesive strip 30B and adhesive strip 32B are on back panel 22B. Adhesive cover 34B covers adhesive strip 30B and adhesive cover 36B covers adhesive strip 32B. Adhesive cover 34B and adhesive covers 36B can be removed to expose adhesive strip 30B and adhesive strip 32B, respectively.

Printable blank sheet 10 can be run through a printer or copier to have an image printed on it. After printing, folder pockets 12A and 12B can be removed from printable blank sheet 10. Folder pockets 12A and 12B will then be freestanding. The outline of folder pockets 12A and 12B are defined by cut lines C10-C24. Folder pockets 12A and 12B can be folded along scored lines S10-S12 to assemble folder pockets 12A and 12B from a flat object into a folder pocket.

When folder pocket 12A has been removed from printable blank sheet 10, folder pocket 12A is assembled by folding tab 24A along scored line S12. Adhesive cover 28A is then removed to expose adhesive strip 26A. Back panel 22A is then folded along scored line S10 and is adhered to adhesive strip 26A on tab 24A. This forms folder pocket 12A. Adhesive cover 34A and adhesive cover 36A can then be removed to expose adhesive strip 30A and adhesive strip 32A, respectively. Folder pocket 12A can then be adhered to a folder blank with adhesive strip 30A and adhesive strip 32A. Folder pocket 12A can be adhered to a right side of a folder blank.

When folder pocket 12B has been removed from printable blank sheet 10, folder pocket 12B is assembled by folding tab 24B along scored line S12. Adhesive cover 28B is then removed to expose adhesive strip 26B. Back panel 22B is then folded along scored line S10 and is adhered to adhesive strip 26B on tab 24B. This forms folder pocket 12B.

Adhesive cover 34B and adhesive cover 36B can then be removed to expose adhesive strip 30B and adhesive strip 32B, respectively. Folder pocket 12B can then be adhered to a folder blank with adhesive strip 30B and adhesive strip 32B. Folder pocket 12B can be adhered to a left side of a folder blank.

Forming folder pockets 12A and 12B from printable blank sheet 10 is advantageous, as it allows a user to create custom print materials without having to order the materials from specialty print shops. This saves time and money for the user. Further, previous printable blank sheets had perforations or bridges surrounding the periphery of folder pockets 12A and 12B to hold folder pockets 12A and 12B in printable blank sheet 10 when printable blank sheet 10 was sent through a printer. Using perforations or bridges to hold folder pockets 12A and 12B in printable blank sheet 10 made it difficult to remove folder pockets 12A and 12B from printable blank sheet 10 after printing, as the perforations or bridges needed to be weakened before they were separated. Trying to weaken the perforations or bridges was difficult due to the irregular placement of the perforations or bridges along the periphery of the flat folder pocket. Thus, it was difficult to remove folder pockets 12A and 12B without tearing body portions of folder pockets 12A and 12B. Further, the intricate features of folder pockets 12A and 12B were easily torn, which ruined the part and made it unsuitable for use as a marketing material. The perforations and bridges also left rough edges on the periphery of the object after they were torn. Further, it was time consuming to remove folder pockets 12A and 12B, as time had to be taken to separate each individual side of folder pockets 12A and 12B.

Using a dry lift adhesive to hold a printable substrate on a film layer eliminates the necessity of having perforations or bridges surrounding the peripheries of folder pockets 12A and 12B, as the dry lift adhesive will hold folder pockets 12A and 12B in printable blank sheet 10 as printable blank sheet 10 is sent through a printer. Thus, cut lines C10-C24 can surround the entire periphery of folder pockets 12A and 12B. Having cut lines C10-C24 surround the entire periphery of folder pockets 12A and 12B is advantageous, as folder pockets 12A and 12B will have clean edges when they are removed from printable blank sheet 10. Having clean edges makes folder pockets 12A and 12B more presentable and suitable for use as marketing materials. Further, folder pockets 12A and 12B can be more easily removed from printable blank sheet 10 compared to previous printable blank sheets, which will reduce or eliminate tearing of folder pockets 12A and 12B as they are removed from printable blank sheet 10. It also saves significant time, as folder pockets 12A and 12B can be peeled out of printable blank sheet 10 in seconds. This also allows folder pockets 12A and 12B to have more intricate shapes than was previously possible.

Notch 16 is also advantageous, as it allows a user to begin separating the printable substrate from the film layer. A user can grasp notch 16 and pull the film layer away from the printable substrate along the dry lift adhesive. Folder pockets 12A and 12B can then be removed from excess sheet area 14, as cut lines C10-C24 surrounding folder pockets 12A and 12B are cut through the printable substrate. Separating folder pockets 12A and 12B from the film layer using notch 16 allows a user to remove folder pockets 12A and 12B from printable blank sheet 10 very quickly and efficiently. It also prevents folder pockets 12A and 12B from being torn or otherwise damaged when they are removed from printable blank sheet 10.

When folder pockets 12A and 12B are removed from printable blank sheet 10, they will be made out of the printable substrate layer of printable blank sheet 10. The printable substrate can include a film layer. The film layer will make folder pockets 12A and 12B stronger than previous paper structures and the film layer will make folder pockets 12A and 12B moisture resistant. This allows folder pockets 12A and 12B to be used in more settings, as stronger materials can be placed in folder pockets 12A and 12B once they are assembled into three-dimensional structures and folder pockets 12A and 12B can be used in harsher environments than was previously possible.

Figure 2A:
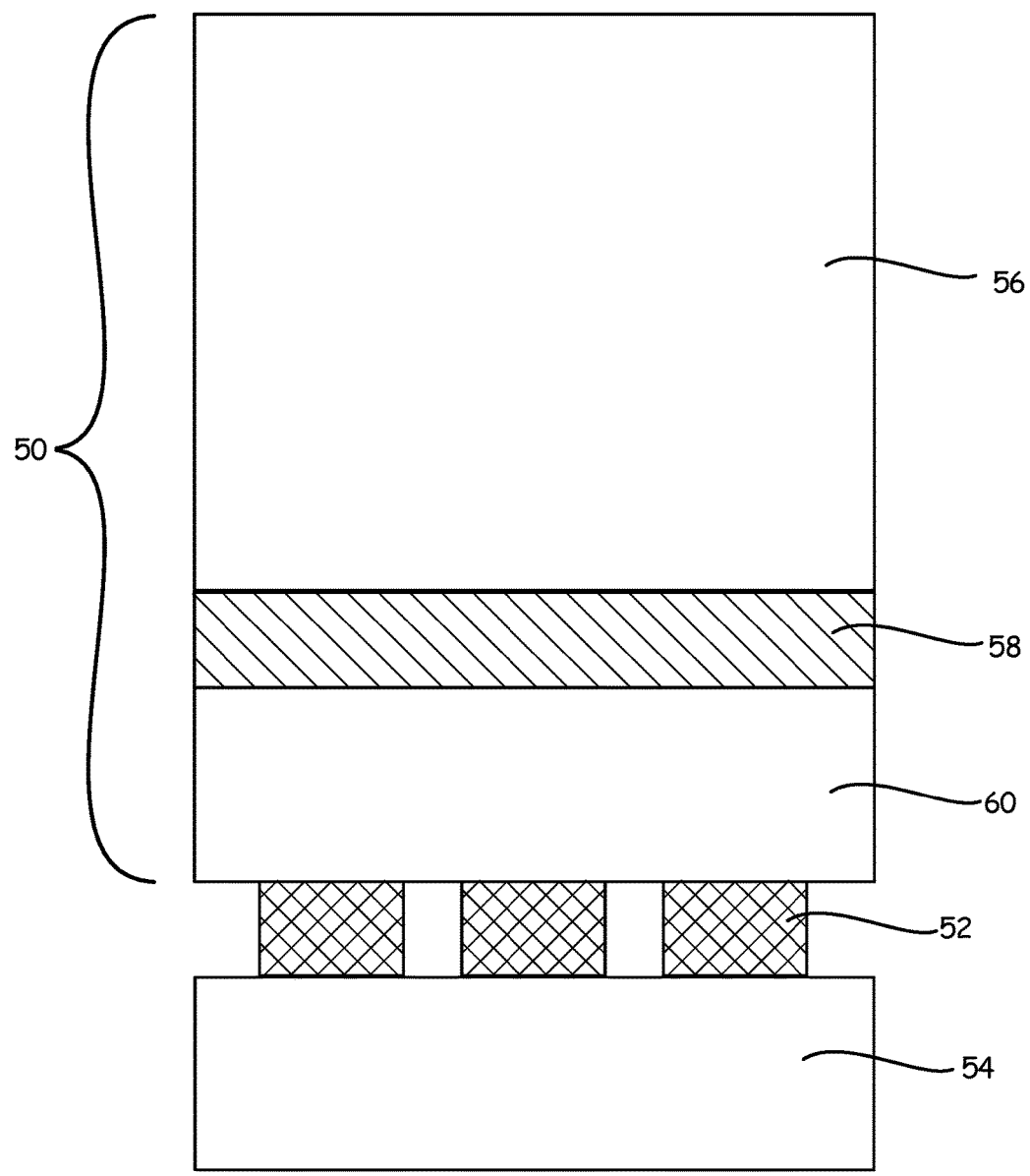
FIG. 2A is a side cross-sectional view of the printable blank sheet showing the layers of material in the printable blank sheet.
Figure 2B:
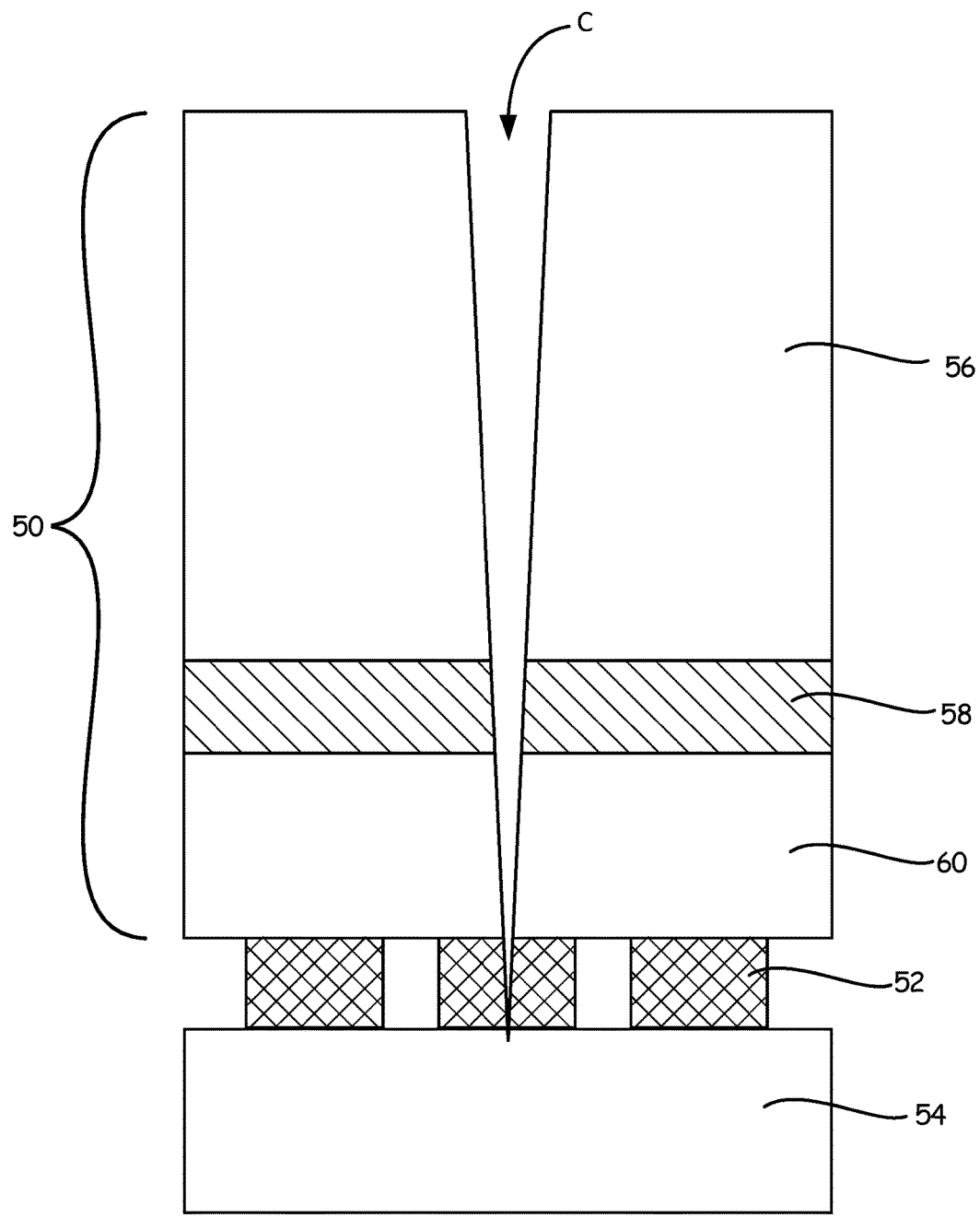
FIG. 2B is a side cross-sectional view of the printable blank sheet after it has been cut.
Figure 2C:
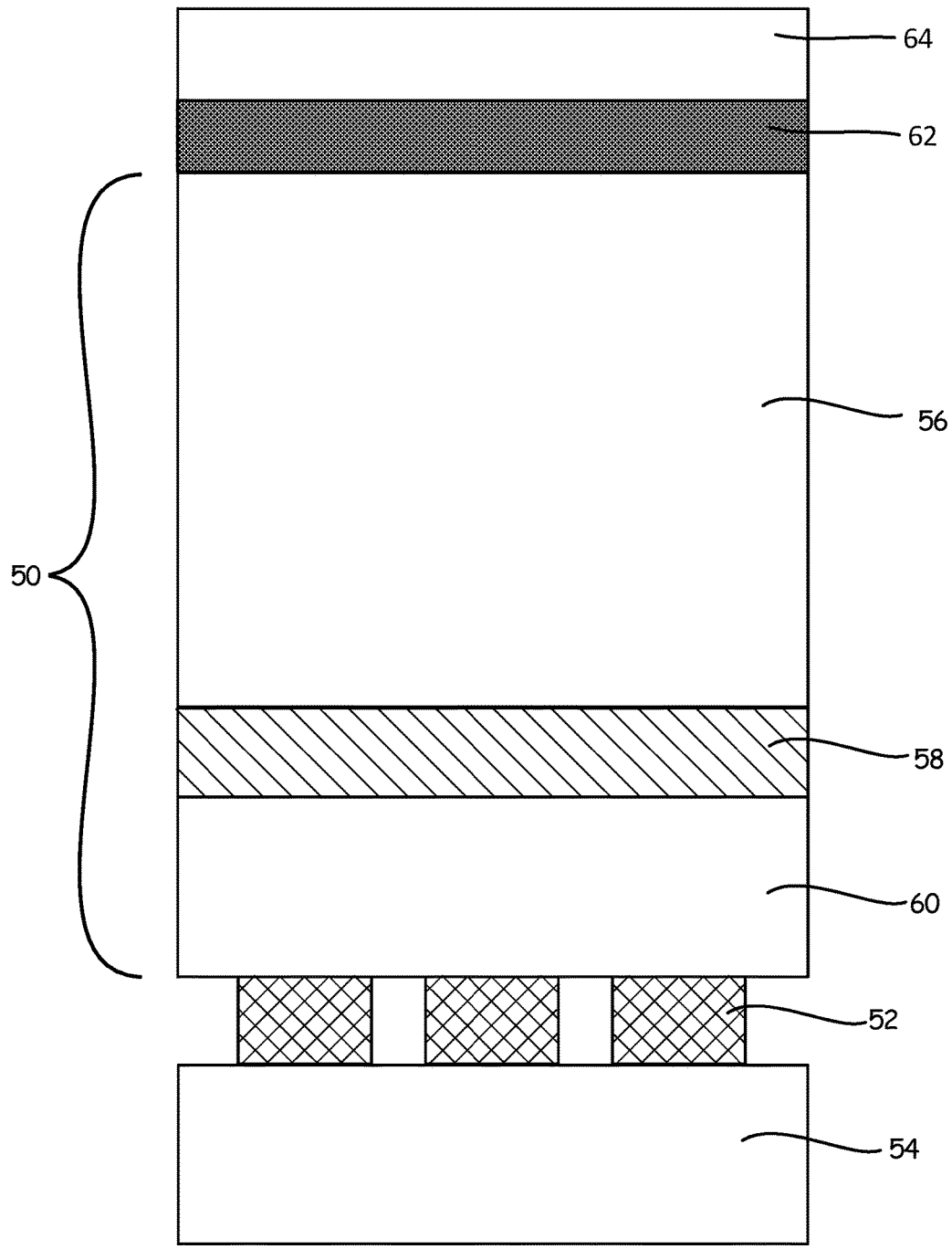
FIG. 2C is a side cross-sectional view of the printable blank sheet showing an adhesive strip and an adhesive cover on the printable blank sheet.

FIG. 2A is a side cross-sectional view of printable blank sheet 10 showing the layers of material in printable blank sheet 10. FIG. 2B is a side cross-sectional view of printable blank sheet 10 after it has been cut. FIG. 2C is a side cross-sectional view of printable blank sheet 10 showing adhesive strip 60 and adhesive cover 62 on printable blank sheet 10. Printable blank sheet 10 includes printable substrate 50, dry lift adhesive 52, film layer 54, and cut line C. Printable substrate 50 includes sheet layer 56, pressure sensitive adhesive 58, and film layer 60. FIG. 2C also shows adhesive strip 60 and adhesive cover 62.

Printable blank sheet 10 is made out of printable substrate 50, dry lift adhesive 52 and film layer 54. Printable substrate 50 includes sheet layer 56, pressure sensitive adhesive 58, and film layer 60. A bottom face of sheet layer 56 is connected to a top face of film layer 60 with pressure sensitive adhesive 58. A bottom face of film layer 60 (the bottom face of printable substrate 50) is connected to a top face of film layer 54 with dry lift adhesive 52. In alternate embodiments, printable substrate 50 can include different or more layers, as long as printable blank sheet 10 is capable of being passed through a printer.

Sheet layer 56 forms the top layer of printable blank sheet 10. Sheet layer 56 is a paper layer in the embodiment shown, but can also be a synthetic material in alternate embodiments, such as polyester (PET), polypropylene, vinyl, or other printable synthetic materials.

Film layer 60 forms the middle layer of printable blank sheet 10. Film layer 60 is biaxially oriented polypropolyene (BOPP) in the embodiment shown, but can be any suitable film in alternate embodiments, including polyethelyene (PE), polyester (PET), and polyvinyl chloride (PVC).

Pressure sensitive adhesive 58 is used to connect a bottom face of sheet layer 56 to a top face of film layer 60. Pressure sensitive adhesive 58 is a pressure activated adhesive that will form a bond between sheet layer 56 and film layer 60 when they are pressed together.

Sheet layer 56, pressure sensitive adhesive 58, and film layer 60 form printable substrate 50. Printable substrate 50 can have a thickness between 0.004 inches (0.1016 millimeters) and 0.018 inches (0.4572 millimeters).

Film layer 54 forms the bottom layer of printable blank sheet 10. Film layer 54 is biaxially oriented polypropolyene (BOPP) in the embodiment shown, but can be any suitable film in alternate embodiments, including polyethelyene (PE), polyester (PET), and polyvinyl chloride (PVC). Film layer 54 can have a thickness between 0.0005 inches (0.0127 millimeters) and 0.004 inches (0.1016 millimeters).

Dry lift adhesive 52 is used to connect a bottom face of film layer 60 (the bottom face of printable substrate 50) to a top face of film layer 54. Dry lift adhesive 52 is a strong adhesive that is applied as a pattern so that there are areas of dead space between areas of dry lift adhesive 52. The high strength of dry lift adhesive 52 will hold folder pockets 12A and 12B in printable blank sheet 10 as printable blank sheet 10 is being sent through a printer. The pattern of dry lift adhesive 52 allows film layer 54 to be pulled off of folder pockets 12A and 12B to be pulled up and away from film layer 54 in an area that has a dead space. Folder pockets 12A and 12B can then be fully removed from printable blank sheet 10 by pulling it off of film layer 54 along dry lift adhesive 52. The pattern of dry lift adhesive 52 also allows film layer 54 to be lifted away from printable substrate 50 in an area that has a dead space. Film layer 54 can then be fully removed from printable blank sheet 10 by pulling it off of printable substrate 50 along dry lift adhesive 52. In alternate embodiments, dry lift adhesive 52 can be applied with varying thicknesses. Areas with a lower thickness will be weak areas where folder pockets 12A and 12B can be separated from film layer 54.

Printable blank sheet 10 can be cut with cut line C, as seen in FIG. 2B. Cut line C extends through printable substrate 50 and dry lift adhesive 52. Cut line C may extend a short distance into film layer 54, but will not cut through film layer 54. Cut line C is formed by die cutting through printable substrate 50 and dry lift adhesive 52. This form of cutting through a top layer but not through a bottom layer is known as kiss cutting. Cut line C allows a periphery of a folder pocket to be cut out of printable substrate 50 while still maintaining film layer 54 as a solid layer.

Cutting through a top layer (or layers) of printable blank sheet 10 but not through a bottom layer allows the top layer to be held on printable blank sheet 10 as printable blank sheet 10 is passed through a printer. After printable blank sheet 10 has been passed through a printer, the folder pockets that have been cut into the top layer of printable blank sheet 10 can be pulled out of printable blank sheet 10 by separating the top layer from the bottom layer along dry lift adhesive 52. Dry lift adhesive 52 has a dry release so neither the folder pocket nor the bottom layer will have a sticky residue left on them after the folder pocket is removed from the bottom layer. In the embodiment seen in FIGS. 2A-2B, printable substrate 50 can be pulled off of film layer 54 along dry lift adhesive 52. A majority of dry lift adhesive 52 will remain on film layer 54, but neither printable substrate 50 nor film layer 54 will have a sticky residue on them. This is advantageous, as the folder pocket that is cut out of printable substrate 50 can then be adhered to a folder blank and used.

Printable blank sheet 10 also includes adhesive strip 60 and adhesive cover 62, as shown in FIG. 2C. Adhesive strips 60 can be positioned on the folder pockets that are held in printable blank sheet 10 to later hold the folders pockets together when they are assembled. Adhesive cover 62 is positioned over each adhesive strip 60 on the folder pocket on printable blank sheet 10 so that printable blank sheet 10 can be run through a printer. Adhesive cover 62 also prevents adhesive strip 60 from getting stuck on other sheets or objects, allowing printable blank sheet 10 to be easily handled and stacked for storage.

Using dry lift adhesive 52 in printable blank sheet 10 is advantageous, as folder pockets can be cut into printable substrate 50 and then easily removed from printable substrate 50 after printable blank sheet 10 has been run through a printer. Dry lift adhesives have been previously used with printable blank sheets when simple two-dimensional objects are being formed. A solid layer (known in the art as a flood coat) of the dry lift adhesive can be applied between two layers. In order for the simple two-dimensional structures to be removed, the dry lift adhesive had to have a weak strength so that the objects could be removed. The weak strength of the dry lift adhesive in previous printable blank sheets limited what objects could be cut into the sheet, as the dry lift adhesive was not strong enough to hold complex and intricate designs in the sheet when the sheet was being run through a printer. Thus, sheets were limited to simple two-dimensional objects with few cut lines, such as rectangular business cards.

Applying dry lift adhesive 52 as a pattern allows dry lift adhesive 52 to have a higher strength than previously used dry lift adhesives. The higher strength dry lift adhesive 52 is capable of holding intricately shaped objects with multiple cut lines in printable blank sheet 10 as printable blank sheet 10 is run through a printer. The intricately shaped objects can then be removed from printable blank sheet 10 by separating printable substrate 50 from film layer 54 where there is a dead space in dry lift adhesive 52. Applying dry lift adhesive 52 as a pattern allows intricate shapes to be cut into printable substrate 50, such as folder pockets 12A and 12B shown in FIG. 1. Objects with intricate shapes are objects that include at least one of the following features: shapes with curved edges; shapes with corners at non-square angles; shapes with edges running neither parallel nor perpendicular to each other; objects with flanges extending outward from a main body portion; objects that are shaped as irregular polygons; objects where at least a portion of the periphery of the object is curved; and objects with scored lines, perforated lines, or die cut lines on a body portion of the object. These complex and intricate shapes will remain attached to film layer 54 during printing due to the higher strength of the dry lift adhesive 52.

Figure 3A:
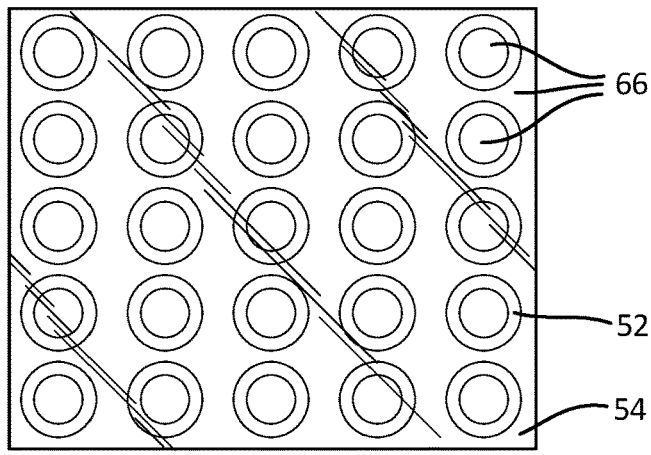
FIG. 3A is a front view of a first embodiment of a patterned laminating adhesive.
Figure 3B:
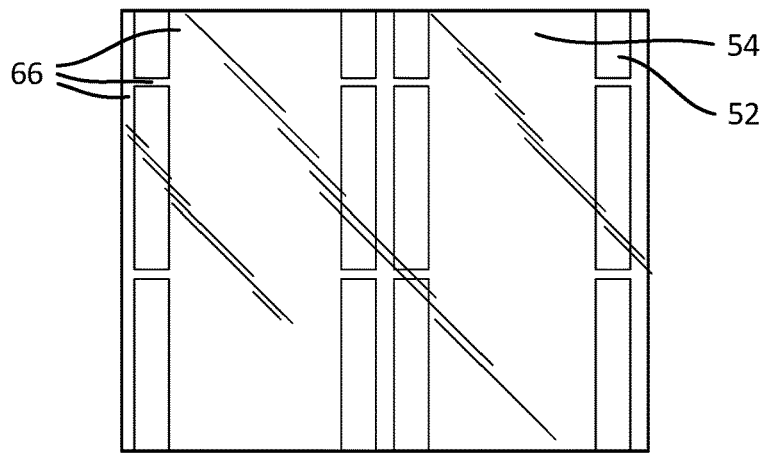
FIG. 3B is a front view of a second embodiment of a patterned laminating adhesive.
Figure 3C:
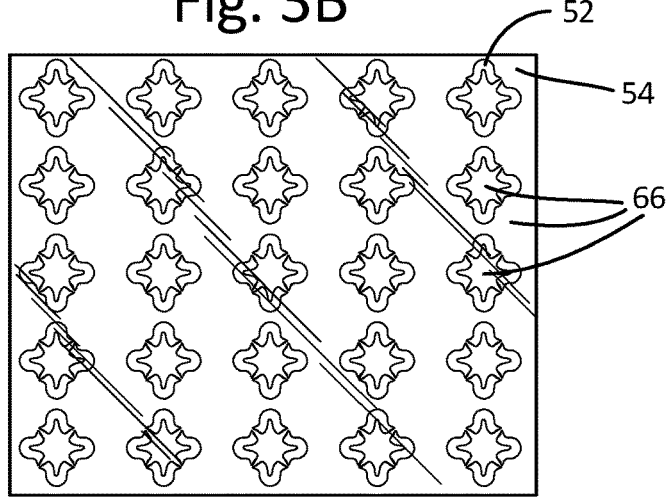
FIG. 3C is a front view of a third embodiment of a patterned laminating adhesive.

FIGS. 3A-3C show examples of a dry lift adhesive being applied as different patterned laminating adhesives 52. FIG. 3A is a front view of a first embodiment of patterned laminating adhesive 52. FIG. 3B is a front view of a second embodiment of patterned laminating adhesive 52. FIG. 3C is a front view of a third embodiment of patterned laminating adhesive 52. FIGS. 3A-3C include patterned laminating adhesive 52, film layer 54, and dead space 66. Patterned laminating adhesive 52 is a dry lift adhesive that is applied as a pattern to facilitate the easy removal of a top layer from film layer 54. Dead spaces 66 are the open spaces where patterned laminating adhesive 52 has not been applied.

As seen in FIG. 3A, patterned laminating adhesive 52 can be applied as a plurality of rings that are spaced apart. As seen in FIG. 3B, patterned laminating adhesive 52 can be applied with voided strips that are capable of being aligned with edges of the complex part. As seen in FIG. 3C, patterned laminating adhesive 52 can be applied as a plurality of V-shaped areas that are arranged in groups of fours and spaced apart.

Dead spaces 66 are positioned between and around patterned laminating adhesive 52. Dead spaces 66 are areas where patterned laminating adhesive 52 has not been applied. When a patterned laminating adhesive is used to connect two different layers of materials, dead spaces 66 provide areas where the layers can be pulled apart. This allows a user to begin to separate the layers along patterned laminating adhesive 52. Dead spaces 66 allow higher strength patterned laminating adhesives 52 to be used, as dead spaces 66 provide gaps in patterned laminating adhesive 52 so that different layers can be separated.

Figure 4:
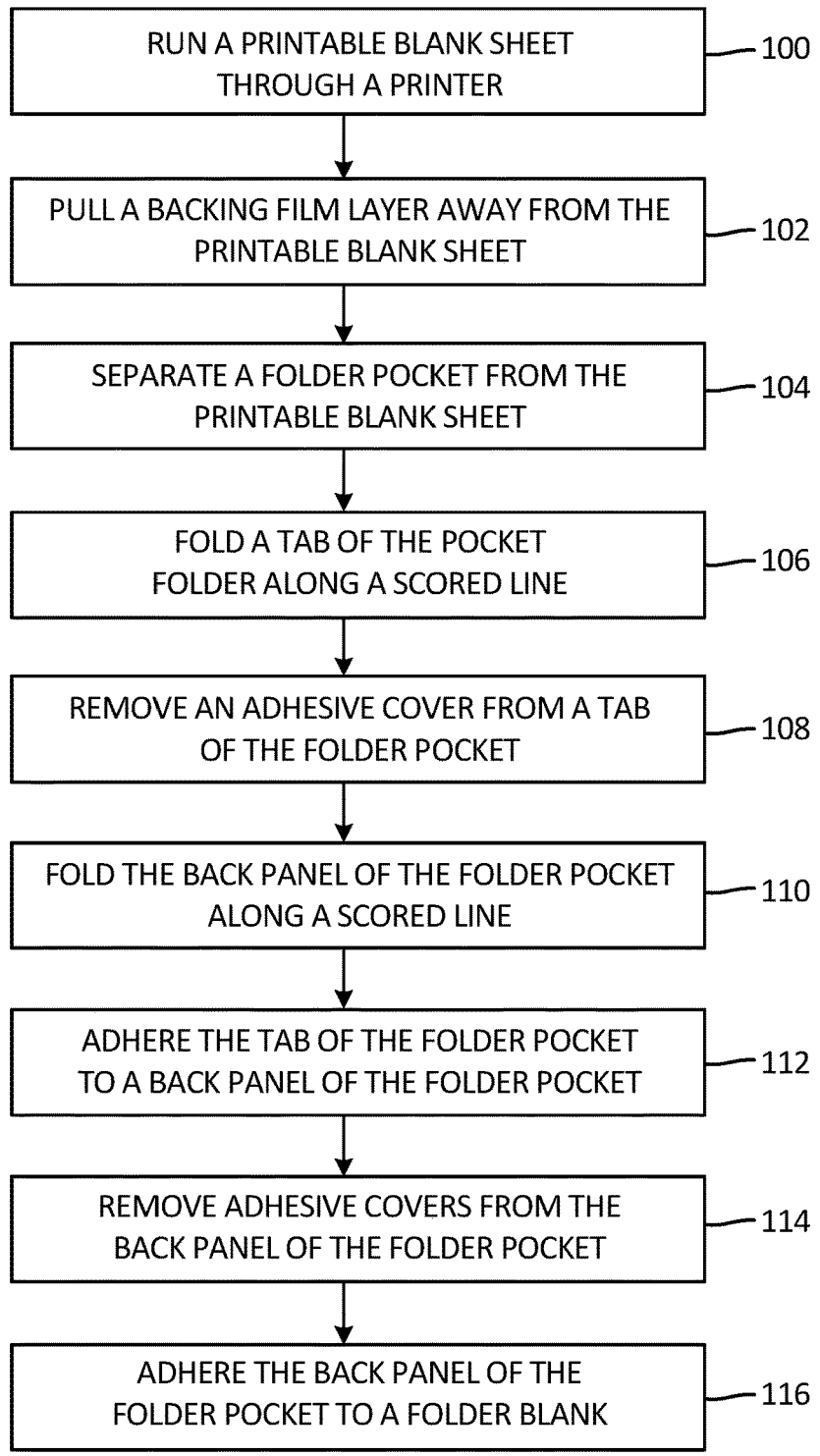
FIG. 4 is a flow chart showing how a folder pocket can be formed.
Figure 5A:
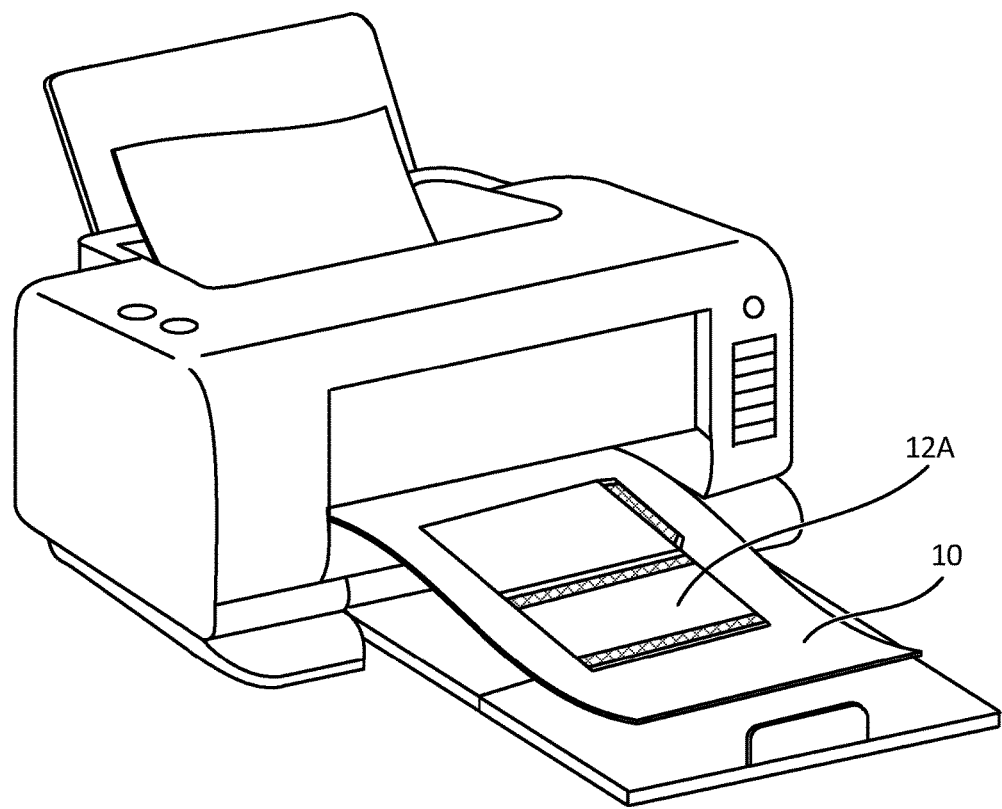
FIG. 5A is a perspective view of the printable blank sheet as it is being run through a printer.
Figure 5B:
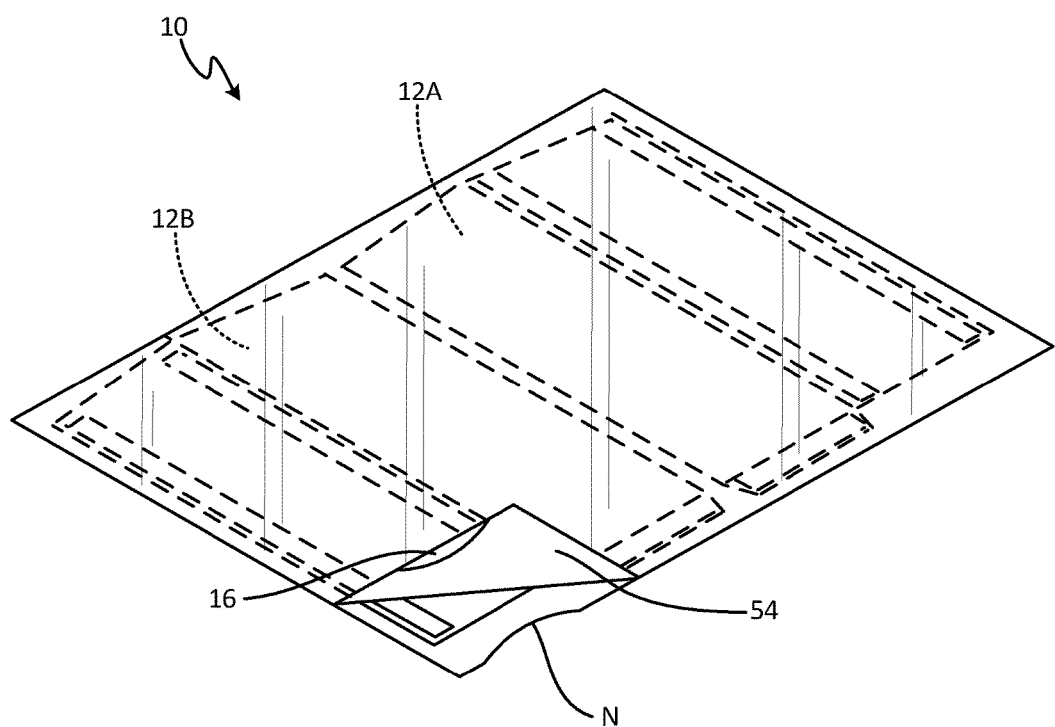
FIG. 5B is a perspective view of the printable blank sheet as a film layer is peeled off of the printable blank sheet.
Figure 5C:
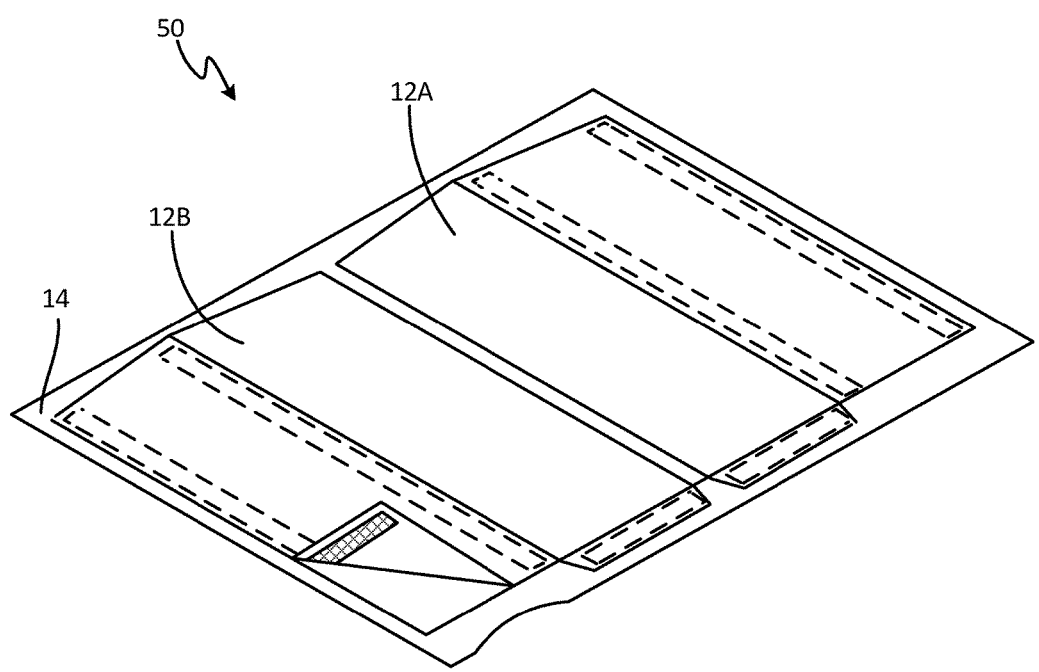
FIG. 5C is a perspective view of the printable blank sheet as the folder pocket is removed from an excess sheet area.
Figure 5D:
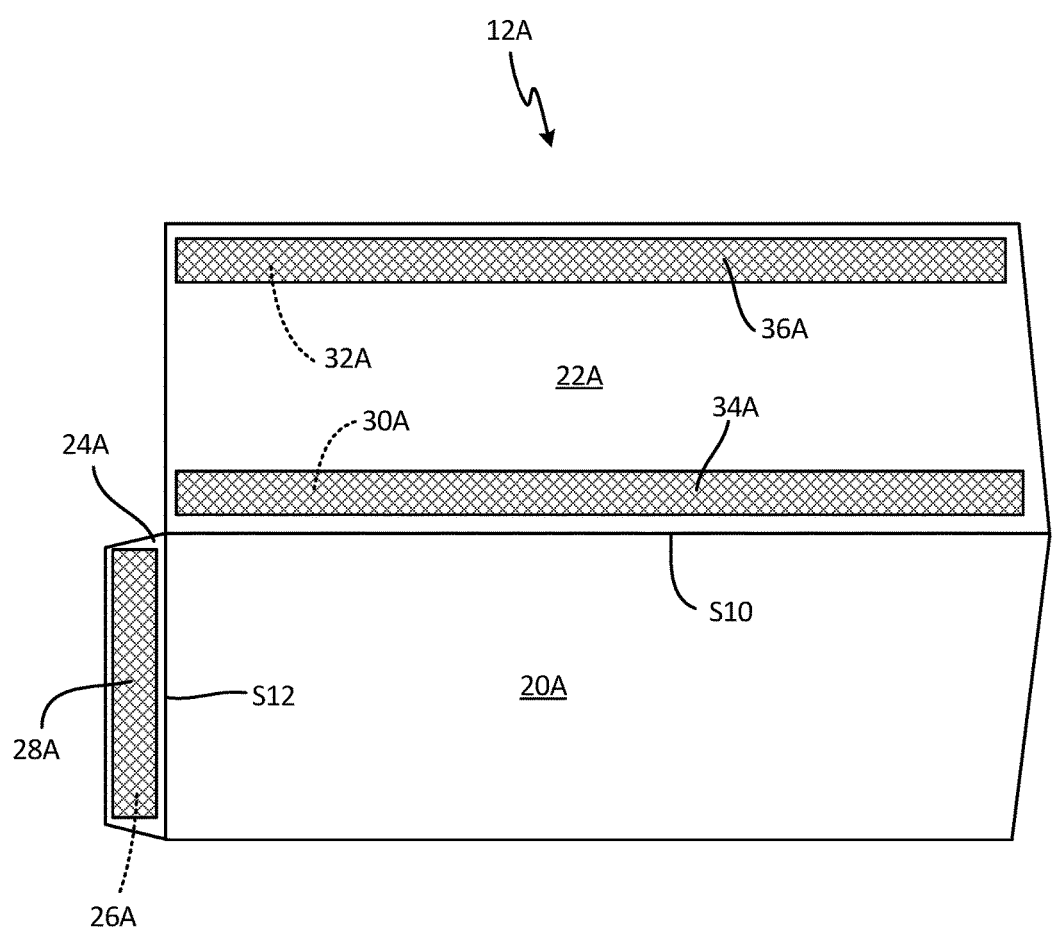
FIG. 5D is a top plan view of the folder pocket after it has been removed from the printable blank sheet.
Figure 5E:
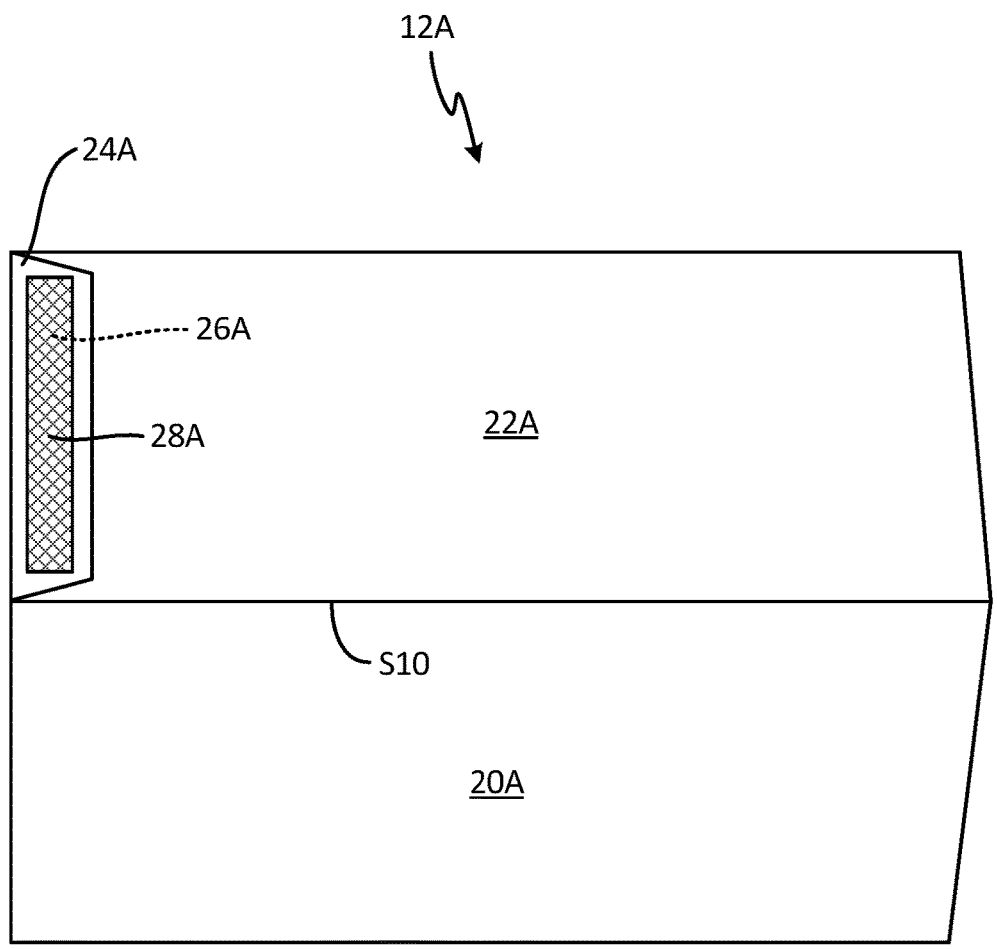
FIG. 5E is a bottom plan view of the folder pocket after a tab has been folded along a scored line.
Figure 5F:
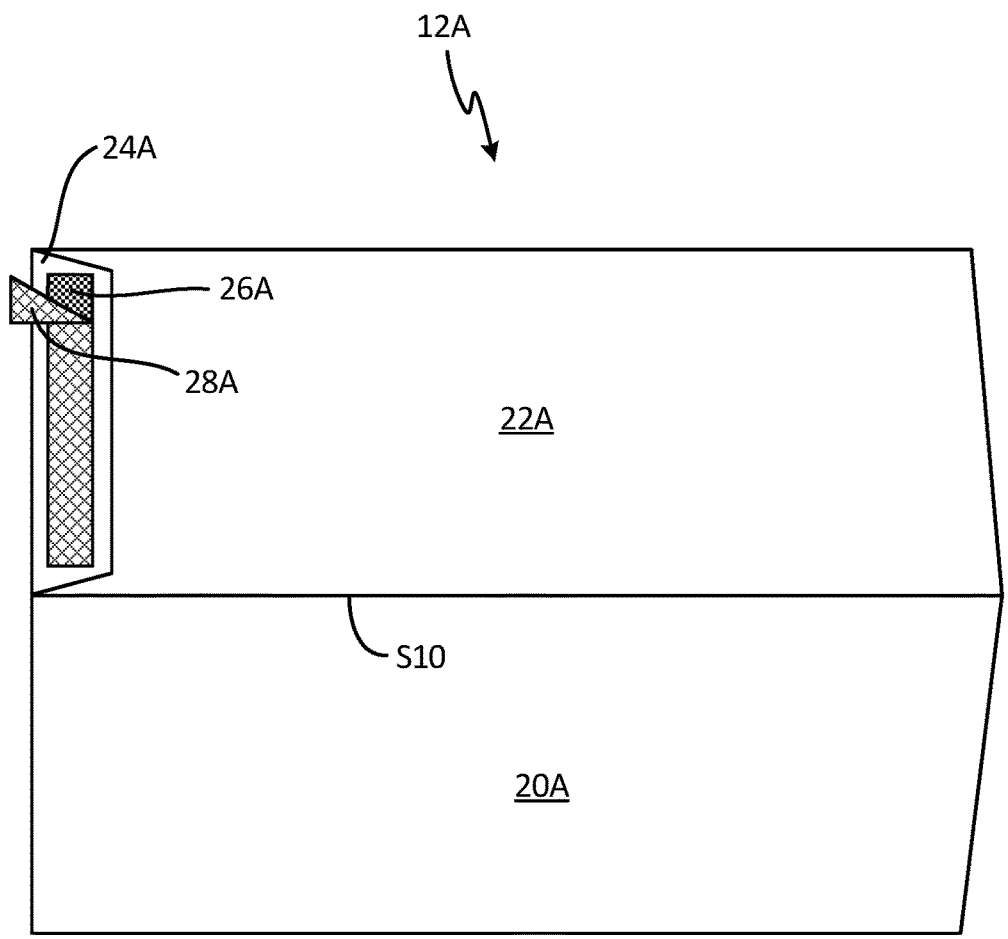
FIG. 5F is a bottom plan view of the folder pocket as an adhesive cover is removed from the tab.
Figure 5G:
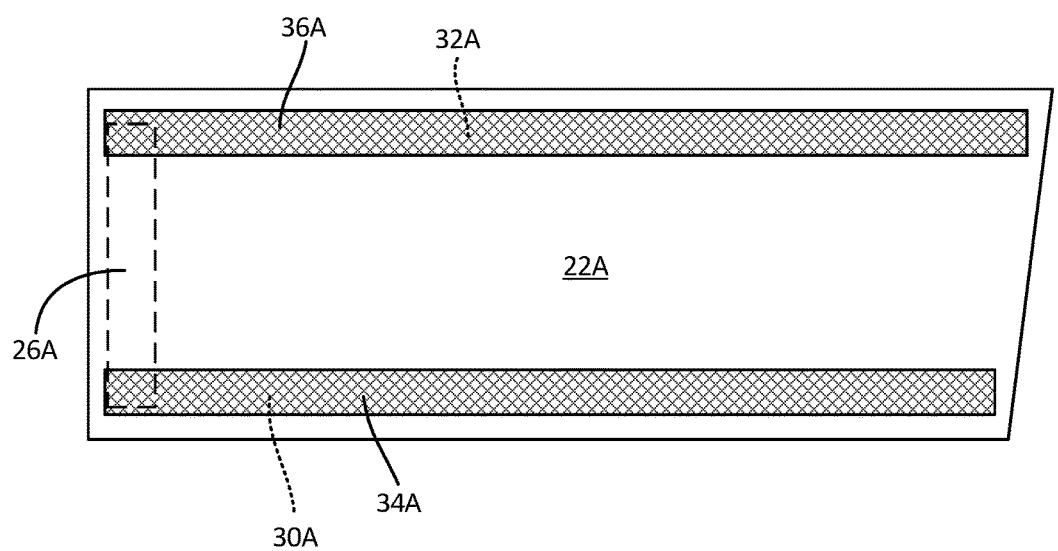
FIG. 5G is a top plan view of the folder pocket after a back panel has been folded along a scored line and adhered to the tab.
Figure 5H:
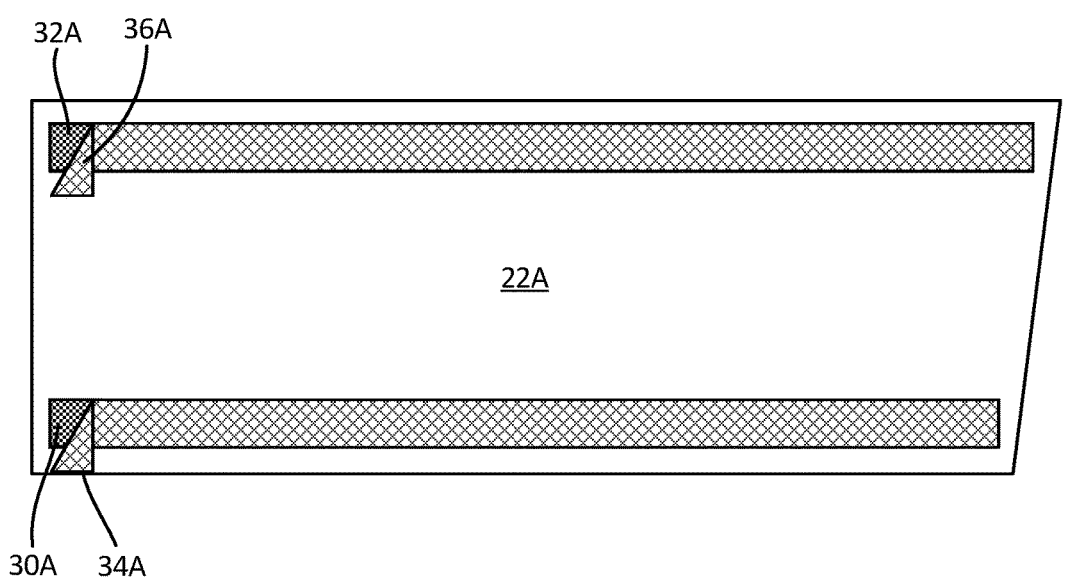
FIG. 5H is a top plan view of the folder pocket as adhesive covers are removed from the back panel.
Figure 5I:
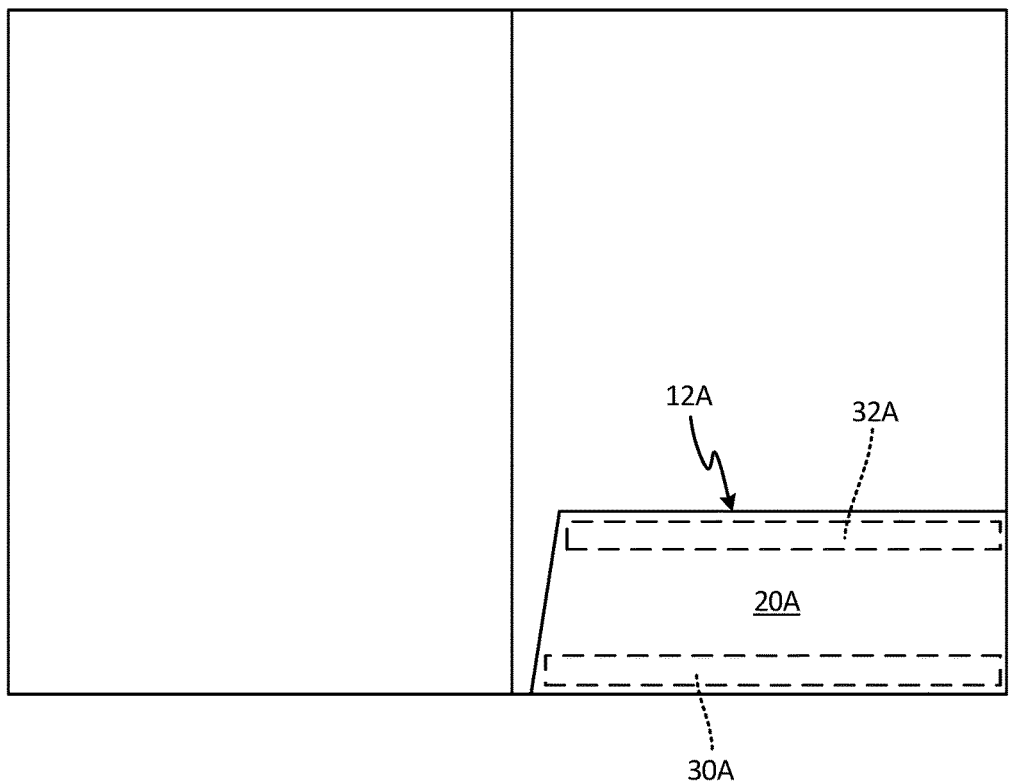
FIG. 5I is a top plan view of a folder blank after the folder pocket has been adhered to the folder blank.

FIG. 4 is a flow chart showing how folder pockets 12A and 12B can be formed. FIG. 4 includes steps 100, 102, 104, 106, 108, 110, 112, 114, and 116 to show how folder pockets 12A and 12B can be formed. FIGS. 5A-5I illustrate steps 100-116 seen in the flow chart in FIG. 4. FIG. 5A is a perspective view of printable blank sheet 10 as it is being run through a printer. FIG. 5B is a perspective view of printable blank sheet 10 as film layer 54 is peeled off of printable blank sheet 10. FIG. 5C is a perspective view of printable blank sheet 10 as folder pockets 12A and 12B is removed from excess sheet area 14. FIG. 5D is a top plan view of folder pocket 12A after it has been removed from printable blank sheet 10. FIG. 5E is a bottom plan view of folder pocket 12A after tab 24A has been folded along scored line S12. FIG. 5F is a bottom plan view of folder pocket 12A as adhesive cover 28A is removed from tab 24A. FIG. 5G is a top plan view of folder pocket 12A after back panel 22A has been folded along scored line S10 and adhered to tab 24A. FIG. 5H is a top plan view of folder pocket 12A as adhesive covers 34A and 36A are removed from back panel 22B. FIG. 5I is a top plan view of a folder blank after folder pocket 12A has been adhered to the folder blank.

Step 100 includes running printable blank sheet 10 through a printer, as seen in FIG. 5A. Printable blank sheet 10 includes printable substrate 50 that is attached to film layer 54 with dry lift adhesive 52. The top layer of printable substrate 50 is sheet layer 56 that is capable of being printed on. In the embodiment shown, sheet layer 56 is a paper layer but sheet layer 56 can be made out of any material that is capable of being printed on in alternate embodiments. Printable blank sheet 10 has a thickness between 0.004 inches and 0.018 inches to make it suitable for being passed through a standard printer. Further, printable blank sheet 10 is sized so that it can be passed through a standard printer.

Printable blank sheet 10 includes folder pockets 12A and 12B that are positioned in printable blank sheet 10. Folder pockets 12A and 12B are made out of printable substrate 50 and are attached to film layer 54 with dry lift adhesive 52. As printable blank sheet 10 is run through a printer, folder pockets 12A and 12B are held in printable blank sheet 10 with dry lift adhesive 52. Dry lift adhesive 52 can be applied in a pattern so that there are areas filled with dry lift adhesive 52 and dead spaces 66 between folder pockets 12A and 12B and film layer 54.

Folder pockets 12A and 12B are assembled so that front panels 20A and 20B, respectively, face outwards when folder pockets 12A and 12B are adhered to a folder blank. A user can print on front panels 20A and 20B of folder pockets 12A and 12B so that this information is viewable to users. Automatic imposition software can be used to create the design that is to be printed on printable blank sheet 10. The automatic imposition software allows a user to create the design for one folder pocket and then the design is automatically reproduced to be applied to every folder pocket 12A and 12B in printable blank sheet 10. The automatic imposition software will also orient the design so that it positioned properly on folder pockets 12A and 12B in printable blank sheet 10.

Step 102 includes separating folder pockets 12A and 12B from printable blank sheet 10. Folder pockets 12A and 12B are separated from printable blank sheet 10 along dry lift adhesive 52. To separate folder pockets 12A and 12B from printable blank sheet 10, a corner of film layer 54 is pulled off of printable blank sheet 10, as seen in FIG. 5B. After a top face of printable blank sheet 10 has been printed on, a corner of film layer 54 can be pulled away from printable blank sheet 10. This can be done by using notch 16. Notch 16 allows a user to easily separate film layer 54 from printable blank sheet 10 along dry lift adhesive 52. Notch 16 can be grasped and then pulled away from printable blank sheet 10, which effectively pulls film layer 54 away from printable substrate 50 along dry lift adhesive 52. Dry lift adhesive 52 holds folder pockets 12A and 12B on film layer 54 and is applied as a pattern so that there are areas filled with dry lift adhesive 52 and dead spaces 66. Notch 16 allows a user to separate film layer 54 from printable blank sheet 10 in an area of dead space 82.

After a corner of film layer 52 is separated from printable substrate 50, a user can place printable blank sheet 10 with printable substrate 50 face down. The user can then grasp notch 16 and peel film layer 54 off of printable blank sheet 10. Film layer 54 will be separated from printable blank sheet 10 along dry lift adhesive 52. A majority of dry lift adhesive 52 will remain on film layer 54 when film layer 54 is peeled off of printable blank sheet 10. Any dry lift adhesive 52 that remains on folder pockets 12A and 12B will be undetectable. Further, any dry lift adhesive 52 that remains on either folder pockets 12A and 12B or on film layer 54 will not be sticky, as dry lift adhesive 52 has a dry release when it is separated.

Step 104 includes separating folder pockets 12A and 12B from printable blank sheet 10. After film layer 54 is removed from printable blank sheet 10, printable substrate 50 is left. Printable substrate 50 includes folder pockets 12A and 12B and excess sheet area 14. Folder pockets 12A and 12B are cut through printable substrate 50 and excess sheet area 14 surrounds folder pockets 12A and 12B. Folder pockets 12A and 12B can be easily removed from excess sheet area 14 by simply lifting them out of excess sheet area 14, as seen in FIG. 5C.

Steps 106-116 will be discussed with reference to folder pocket 12A. However, the same steps can be followed to assemble folder pocket 12B and adhere it to a folder blank. Folder pocket 12A can be adhered to a right side of a folder blank and folder pocket 12B can be adhered to a left side of the folder blank.

Step 106 includes folding tab 24A of folder pocket 12A along scored line S12. FIG. 5D shows folder pocket 12A after it has been removed from printable blank sheet 10. As seen in FIG. 5D, scored line S12 connects tab 24A to front panel 20A. Tab 24A is folded along scored line S12 so that adhesive strip 26A and adhesive cover 28A face away from front panel 20A when tab 24A has been folded along scored line S12, as seen in FIG. 5E.

Step 108 includes removing adhesive cover 28A from tab 24A of folder pocket 12A. As shown in FIG. 5E, adhesive cover 28A covers adhesive strip 26A on tab 24A. As shown in FIG. 5F, adhesive cover 28A can be peeled off of adhesive strip 26A.

Step 110 includes folding back panel 22A of folder pocket 12A along scored line S10. As shown in FIG. 5F, scored line S10 connects back panel 22A to front panel 20A. Back panel 22A is folded along scored line S10 towards tab 24A.

Step 112 includes adhering tab 24A of folder pocket 12A to back panel 22A of folder pocket 12A. As back panel 22A is folded along scored line S10 towards tab 24A, it will come into contact with adhesive strip 26A on tab 24A, as seen in FIG. 5G. Tab 24A holds back panel 22A in position with adhesive strip 26A.

Step 114 includes removing adhesive covers 34A and 36A from back panel 22A of folder pocket 12A. As shown in FIG. 5G, adhesive covers 34A and 36A cover adhesive strips 30A and 32A, respectively. As shown in FIG. 5H, adhesive covers 34A and 36A can be peeled off of adhesive strips 30A and 32A, respectively.

Step 116 includes adhering back panel 22A of folder pocket 12A to a folder blank. After adhesive covers 34A and 36A have been removed, adhesive strips 30A and 32A will be exposed. Folder pocket 12A can then be positioned on a folder blank with back panel 22A facing the folder blank and front panel 20A facing outwards. Folder pocket 12A is adhered to the folder blank by pressing adhesive strips 30A and 32A onto the folder blank, as shown in FIG. 5I.

Printable blank sheet 10 is advantageous, as folder pockets 12A and 12B can be cut out of printable substrate 50 and then separated from film layer 54. Cutting folder pockets 12A and 12B out of printable substrate 50 will give folder pockets 12A and 12B smooth edges, making folder pockets 12A and 12B suitable for use as marketing materials. Further, it is easy to remove folder pockets 12A and 12B from printable blank sheet 10 and folder pockets 12A and 12B will not tear as they are removed. This is advantageous over previous printable blank sheets that utilized perforations or bridges to hold folder pockets 12A and 12B in printable blank sheet 10.

Figure 6:
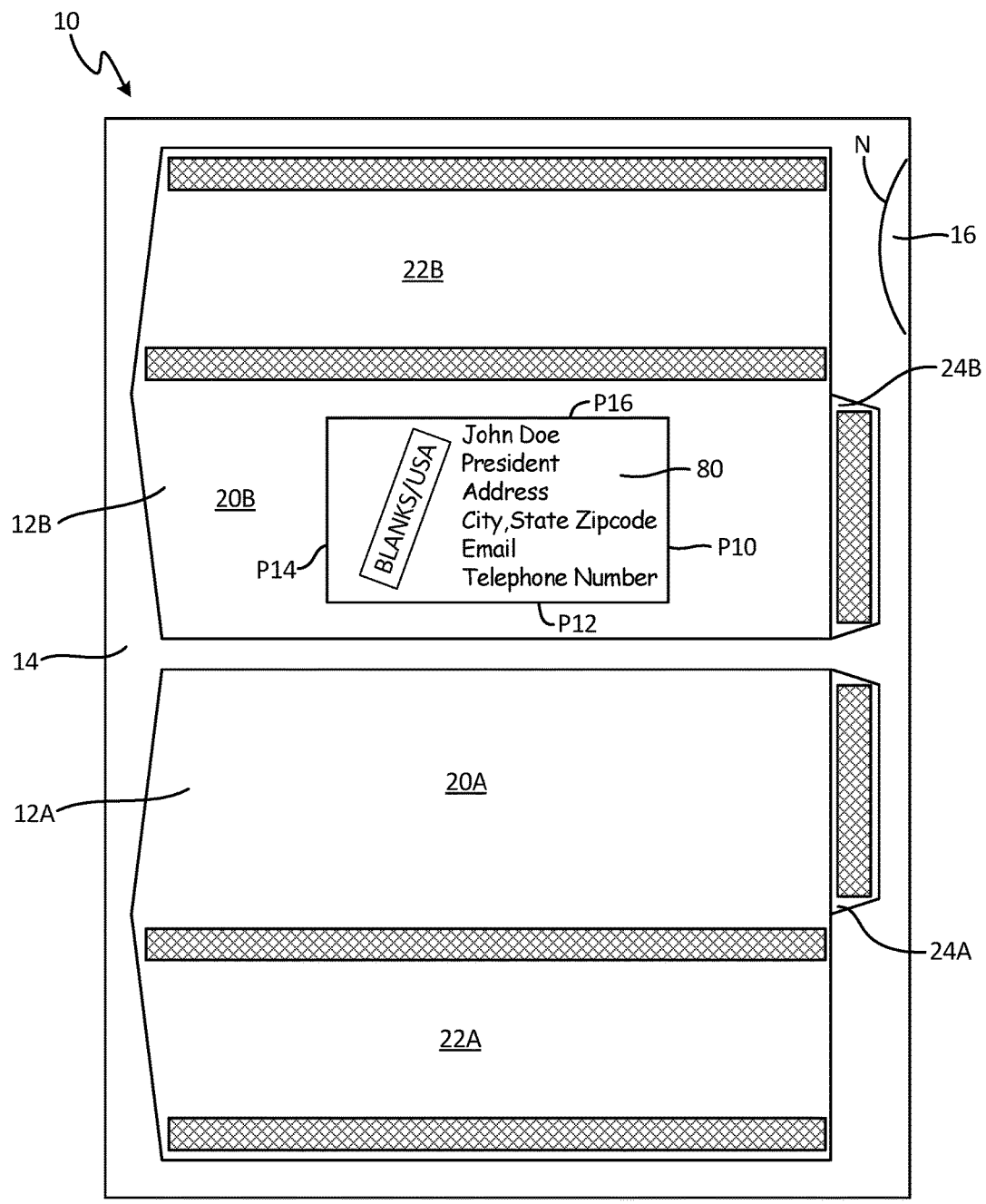
FIG. 6 is a top plan view of folder pockets and a business card in a printable blank sheet.

FIG. 6 is a top plan view of folder pockets 12A and 12B and business card 80 in printable blank sheet 10. Printable blank sheet 10 includes folder pocket 12A, folder pocket 12B, excess sheet area 14, notch 16, notch cut line N, business card 80, and perforated lines P10, P12, P14, and P16. Folder pocket 12A includes front panel 20A, back panel 22A, and tab 24A. Folder pocket 12B includes front panel 20B, back panel 22B, and tab 24B.

Printable blank sheet includes folder pockets 12A and 12B, as discussed above in reference to FIGS. 1-5I. In the embodiment shown in FIG. 6, business card 80 is positioned on front panel 20B of folder pocket 12B. Perforated lines P10-P16 surround business card 80. Business card 80 is held in folder pocket 12B with perforated lines P10-P16. Perforated lines P10-P16 can be micro-perforation lines. In an alternate embodiment, business card 80 can be on folder pocket 12A, or business cards 80 can be on both folder pockets 12A and 12B.

When printable blank sheet 10 is run through a printer, a user can print his/her information on business card 80. Then folder pocket 12B can be assembled and adhered to a folder blank. Business card 80 will be positioned on a front of folder pocket 12B when folder pocket 12B is attached to a folder blank. Business card 80 can be removed from folder pocket 12B by separating it along perforated lines P10-P16. In alternate embodiments, business card 80 can be a key fob, a coupon, or any other object. Including business card 80 in folder pocket 12B allows a portion of folder pocket 12B to be removed and retained if the folder, including folder pocket 12B, is disposed of. Further, business card 80 is easier to transport and retain than a folder, allowing the information on the business card to be easier to access and retain.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A printable blank sheet comprising:
    a sheet with a top substrate and a bottom layer;
    a dry lift adhesive connecting the top substrate to the bottom layer;
    cut lines in the sheet that extend through the top substrate and the dry lift adhesive but not through the bottom layer; and
    a folder pocket cut into the top substrate with a periphery of the folder pocket defined by the cut lines, wherein the folder pocket can be removed from the sheet by separating the folder pocket and the bottom layer along the dry lift adhesive, and wherein the folder pocket comprises:
        a front panel;
        a back panel connected to the front panel along a first scored line; and
        a tab connected to the front panel along a second scored line;
        wherein the back panel is configured to be attached to a folder blank.

2. The printable blank sheet of claim 1, wherein the dry lift adhesive is applied in a pattern, and wherein the pattern is a voided pattern with areas covered with dry lift adhesive and areas that are open space.

3. The printable blank sheet of claim 2, wherein the top substrate can be separated from the bottom layer in the areas of open space in the pattern.

4. The printable blank sheet of claim 1, wherein the bottom layer of the sheet is a film layer.

5. The printable blank sheet of claim 1, wherein the top substrate further comprises:
    a sheet layer that is capable of being printed on;
    a film layer; and
    a pressure sensitive adhesive that connects a bottom face of the sheet layer to a top face of the film layer.

6. The printable blank sheet of claim 1, and further comprising:
    a first adhesive strip on the tab;
    a first adhesive cover positioned over the first adhesive strip;
    a second adhesive strip on the back panel;
    a second adhesive cover positioned over the second adhesive strip;
    a third adhesive strip on the back panel; and
    a third adhesive cover positioned over the third adhesive strip.

7. The printable blank sheet of claim 1, and further comprising:
    an object in the front panel of the folder pocket; and
    perforation lines defining the object in the front panel of the folder pocket, wherein the object can be removed from the front panel of the folder pocket by separating the object from the front panel along the perforation lines.

8. A printable blank sheet comprising:
    a sheet with a top substrate and a bottom layer;
    a dry lift adhesive connecting the top substrate to the bottom layer;
    cut lines in the sheet that extend through the top substrate and the dry lift adhesive but not through the bottom layer;
    a folder pocket cut into the top substrate with a periphery of the folder pocket defined by the cut lines, wherein the folder pocket can be removed from the sheet by separating the folder pocket and the bottom layer along the dry lift adhesive, and wherein the folder pocket comprises:
        a front panel;
        a back panel connected to the front panel along a first scored line; and
        a tab connected to the front panel along a second scored line;
        wherein the back panel is configured to be attached to a folder blank;

a first adhesive strip on the folder pocket; and
a first adhesive cover is positioned on the first adhesive strip.

9. The printable blank sheet of claim 8, wherein the first adhesive strip is positioned on the tab of the folder pocket and is configured to adhere the tab to the back panel.

10. The printable blank sheet of claim 9, and further comprising:
a second adhesive strip on the back panel;
a second adhesive cover is positioned over the second adhesive strip;
a third adhesive strip on the back panel; and
a third adhesive cover is positioned over the third adhesive strip;
wherein the second adhesive strip and the third adhesive strip are configured to adhere the folder pocket to a folder blank.

11. The printable blank sheet of claim 8, wherein the dry lift adhesive has a voided pattern with areas covered with dry lift adhesive and areas that are open space.

12. The printable blank sheet of claim 8, wherein the bottom layer of the sheet is a film layer.

13. The printable blank sheet of claim 8, wherein the top substrate further comprises:
a sheet layer that is capable of being printed on;
a film layer; and
a pressure sensitive adhesive that connects a bottom face of the sheet layer to a top face of the film layer.

14. A method of creating a custom print folder pocket, the method comprising:
running a printable blank sheet through a printer, wherein the sheet includes a top substrate that is attached to a back layer with a dry lift adhesive, wherein the top substrate is printed on when the printable blank sheet is run through the printer, wherein the sheet has cut lines extending through the top substrate and the dry lift adhesive but not through the back layer, and wherein the cut lines define a periphery of a folder pocket formed in the top substrate of the sheet;
separating the folder pocket from the back layer along the dry lift adhesive;
assembling the folder pocket, wherein the folder pocket includes a front panel, a back panel connected to the front panel along a first scored line, and a tab connected to the front panel along a second scored line; and
adhering the back panel of the folder pocket to a folder blank.

15. The method of claim 14, wherein separating the folder pocket from the back layer along the dry lift adhesive further comprises:
pulling a corner of the back layer away from the printable blank sheet using a notch that is cut into the top substrate;
peeling the back layer off of the sheet by separating the back layer from the dry lift adhesive and the top substrate; and
removing the folder pocket from an excess sheet area of the top substrate.

16. The method of claim 14, wherein assembling the folder pocket comprises:
folding the tab of the folder pocket along the second scored line;
removing a first adhesive cover from a first adhesive strip on the tab of the folder pocket;
folding the back panel of the folder pocket along the first scored line; and
adhering the back panel of the folder pocket to the tab of the folder pocket with the first adhesive strip.

17. The method of claim 16, wherein adhering the back panel of the folder pocket to a folder blank comprises:
removing a second adhesive cover from a second adhesive strip on the back panel of the folder pocket;
removing a third adhesive cover from a third adhesive strip on the back panel of the folder pocket; and
adhering the folder pocket to the folder blank with the second adhesive strip and the third adhesive strip.

18. The method of claim 17, wherein the first adhesive cover and the first adhesive strip, the second adhesive cover and the second adhesive strip, and the third adhesive cover and the third adhesive strip are on the printable blank sheet when the printable blank sheet is run through the printer.

* * * * *